United States Patent [19]

Williams et al.

[11] Patent Number: 4,492,782
[45] Date of Patent: Jan. 8, 1985

[54] MOULDING COMPOUNDS BASED ON POLYESTER

[75] Inventors: Richard S. Williams, Bromsgrove; Terry Daniels, Oldbury, both of England

[73] Assignee: BIP Chemicals Limited, Manchester, England

[21] Appl. No.: 517,446

[22] Filed: Jul. 26, 1983

[30] Foreign Application Priority Data

Aug. 3, 1982 [GB] United Kingdom ............... 8222385

[51] Int. Cl.³ .................. C08K 5/07; C08L 67/00; C08L 67/04
[52] U.S. Cl. .................. 524/293; 260/DIG. 35; 524/394; 524/451; 524/539
[58] Field of Search ............... 260/DIG. 35; 524/293, 524/451, 394, 539

[56] References Cited

U.S. PATENT DOCUMENTS

| 3,368,995 | 2/1968 | Furukawa et al. | 524/417 |
| 3,396,128 | 8/1968 | Matumoto et al. | 260/DIG. 35 |
| 3,660,357 | 5/1972 | Kolycheck | 260/DIG. 35 |
| 3,812,077 | 5/1974 | Hobbs | 260/DIG. 35 |
| 4,373,067 | 2/1983 | Dieck et al. | 524/539 |
| 4,391,938 | 7/1983 | Memon et al. | 524/539 |
| 4,405,741 | 9/1983 | Lee | 524/539 |
| 4,417,018 | 11/1983 | Ogawa et al. | 524/261 |

FOREIGN PATENT DOCUMENTS

| 2015013 | 9/1979 | United Kingdom . |
| 2015014 | 9/1979 | United Kingdom . |
| 2015031 | 9/1979 | United Kingdom . |
| 2021131 | 11/1979 | United Kingdom . |

*Primary Examiner*—Ronald W. Griffin
*Attorney, Agent, or Firm*—Cushman, Darby & Cushman

[57] ABSTRACT

A moulding composition is based on polyethylene terephthalate (PET) and contains as additives polycaprolactone with a number average molecular weight greater than 10,000 and a nucleant for crystallization of the PET.

The composition can also contain a reinforcing fibre, such as glass, and a plasticizing additive, which may be, for example, a lower molecular weight polycaprolactone, or a plasticizer such as dibenzyl adipate.

19 Claims, No Drawings

MOULDING COMPOUNDS BASED ON POLYESTER

The present invention relates to polyester compositions for moulding materials, and particularly to novel polyester compositions which exhibit good mouldability.

Polyethylene terephthalate is used for many products such as fibres and films because of its excellent resistance to heat, resistance to chemicals, mechanical and electrical properties. However, in the field of plastics moulding, when it is used to produce, for example, injection moulded articles, it has many shortcomings which arise primarily from its particular crystallisation behaviour. Polyethylene terephthalate crystallises very slowly from the molten state, and has a relatively high second order transition temperature so that mouldings made from it exhibit poor dimensional stability, and have to be made at higher than normal mould temperatures.

It is therefore desirable, for moulding applications, to increase the rate of crystallisation of the polyethylene terephthalate and lower its second order transition temperature, and there is a substantial body of prior art concerned with various additives for achieving this purpose, for example, to U.K. Published Applications Nos. 2,015,013A and 2,015,014A (DuPont) U.K. Published Application No. 2,021,131A (Toyobo) EP Published Application No. 0 021 648 (ICI) and U.S. Pat. No. 3,368,995 (Teijin).

Thus, a nucleating agent may be added to the polyethylene terephthalate to speed up its crystallisation, a plasticiser to encourage molecular movement within the composition and facilitate crystallisation at lower temperatures, and a polymeric additive may be used to enhance physical properties whilst preferably also improving crystallisation. It is also well-known that it is advantageous to include a fibrous reinforcement such as glass fibre in the composition.

Furthermore, it is known that polybutylene terephthalate (PBT), which is used in moulding applications, may have incorporated into its moulding compositions a polycaprolactone of molecular weight 5000 to 300,000, either in small quantities to act as a mould release agent for PBT. (Jap. Patent Publication No. 51 058 455) or in larger quantities to improve impact resistance in a filled composition (J. Patent Publication No. 51 058 456). There is no suggestion in this, however, that the polycaprolactone would affect the crystallisation rate of PBT or, indeed PET, since the crystallisation rate of PBT is very good, and impact modifiers or mould release agents are normally not concerned with polymer crystallisation rates.

We have now found a novel combination of additives which gives a polyethylene terephthalate moulding composition of advantageous properties.

Thus according to the present invention a polyester moulding composition comprises polyethylene terephthalate or a polyester containing at least 80% of polyethylene terephthalate repeating units, polycaprolactone and a nuleant for crystallisation of the polyethylene terephthalate the polycaprolactone having a number average molecular weight of above 10,000.

Preferably the composition also contains a reinforcing fibre, for example short lengths of reinforcing fibre such as glass fibre, although other types of fibre which will stand up to the processing conditions to which the composition is subjected may be used.

The nucleant may be either a metal salt of an organic acid, for example a metal stearate, acetate or benzoate, or a finely divided material which does not melt at or below the melting point of polyethylene terephthalate, for example microtalc. The preferred nucleant is a group 1 metal stearate, or microtalc with a particle size of less than 20 microns.

Preferably the group I metal stearate is sodium stearate, which is a known nucleant for polyethylene terephthalate and gives easier nucleation of the polyester. The nucleant is preferably used in an amount no more than 1% by weight of the composition, particularly in the range 0.1 to 0.7% by weight. However, if a finely divided solid nucleant is used it may be used in greater proportion, eg up to six parts by weight per 100 parts by weight total polymer, and may be used, if desired, in addition to a nucleant of the other type. When no fibrous reinforcement is employed however, the amount of finely divided solid nucleant is preferably not more than 1.9 parts by weight per 100 parts by weight total polymer. It is to be noted that the maximum nucleation when using a finely divided solid type nucleant appears to be achieved at the same low levels as with the metal stearates, so that when more is used the excess functions as a filler.

The polycaprolactone is an aliphatic polyester which has a repeat unit of $-CO-(CH_2)_5-O-_n$, the end groups depending upon the initiator used to start polymerisation of the caprolactone. In the present invention, the caprolactone polymers have a number average molecular weight above 10,000, for example in the range of 10,000 to 300,000 however, lower molecular weight polycaprolactones may additionally be included, eg those corresponding to n being in the range of 2 to 35, which gives material in the range of a liquid pre-polymer type to a waxy solid at room temperature.

Preferably the higher molecular weight polycaprolactones have a number average (N A) Molecular weight of at least 20,500 and preferably also a N A molecular weight not greater than 100,000.

The amount of the higher molecular weight polycaprolactone in the composition will generally be at least 2.5 parts by weight per 100 parts by weight total polymer and may, if desired, be substantial e.g. up to 25 parts by weight per 100 parts by weight total polymer, but the amount of the lower molecular weight material, if used, is lower, e.g. up to 6 parts by weight per 100 parts by weight total polymer. (By 'total polymer' in this specification we mean the total of polyethylene terephthalate based polyester plus the higher molecular weight polycaprolactone).

The lower molecular weight polycaprolactone, when used in the composition, can be considered to be a plasticiser for the polyethylene terephthalate and can be replaced wholly or partially by other plasticisers. Such plasticisers include esters of aromatic acids or aromatic alcohols, such as dibenzyl adipate and neopentyl glycol dibenzoate, and polyethers such as polyethylene glycols. The total amount of plasticizer will be as indicated for the lower molecular weight polycaprolactone above, and preferably is in the range 1 to 4 parts by weight per 100 parts by weight of total polymer.

In examining the crystallisation behaviour of polyethylene terephthalate Differential Thermal Analysis (DTA) is used to measure (a) Recrystallisation temperature (Tr) (b) Second order glass transition temperature (Tg) and (c) Cold crystallisation temperature (T$_c$).

In DTA the sample and an inert reference sample are heated according to a predetermined temperature programme. Their difference in temperature (ΔT) and the sample temperature (T) are recorded as a function of time. Endothermic and exothermic changes in the sample such as melting and recrystallisation, give rise to peaks in the ΔT trace, and second order transitions, such as the glass transition, to shifts in the baseline.

Thus, (a) is measured by heating the polymer until it is molten and then cooling at a constant rate until recrystallisation occurs.

(b) and (c) are measured by melting the sample, quenching to a low temperature and then carrying out DTA with a constant heating rate.

For pure polyethylene terephthalate the Tr is about 190° C., Tg is about 90° C. and T$_c$ is about 160° C. In adding a nucleant and plasticizer etc to the polyethylene terephthalate an objective is to raise Tr and to lower Tg and T$_c$, as well as to increase the rate of recrystallisation.

The invention will now be described more particularly by means of examples.

EXAMPLES

Experimental Procedures

Compositions were prepared by melt processing, in a twin-screw extruder, all the ingredients being dry blended and compounded together. The glass was added to the molten polymer/additive mixture at a second port in the extruder. The polymer and other additives require careful drying to a very low moisture content (generally less than 0.02%).

The extruded material was cut and the granules dried to less than 0.02% moisture prior to injection moulding. In evaluating the moulding performance, the mould temperature is important. In the small-scale screening tests reported below, the mould temperature was varied and the ease of mould release and surface appearance of the moulding noted at each temperature. If the moulding stuck or its surface appearance was poor, the mould temperature was raised until these properties were satisfactory.

The molecular weight of the material was determined by dilution viscometry in o-chlorophenol at 25° C. using the relationship reported by Ward (Trans Faraday Soc. 1957, 53, 1406):

$$[\eta] = 1.7 \times 10^{-4} M_n 0.83$$

Thermoanalytical measurements were made on extruded materials which had been remelted at 290° C. and quenched by dropping into liquid nitrogen. The sample was examined by Differential Thermal Analysis (DTA) in a Stanton-Redcroft STA 780 simultaneous thermal analysis system: reference material—alumina; programme—heat at 10° C./min to 350° C., cool at 10° C./min or the natural rate, whichever is the lower, to room temperature.

A DTA curve for a quenched specimen shows the glass transition (Tg), an exothermic secondary (or 'cold') crystallisation (Tc) and the melting endotherm (Tm) on heating, and recrystallisation from the melt (Tr) on cooling. The size of the secondary crystallisation peak and the temperature at which it occurs shows the effectiveness of the additives in promoting crystallisation: a small Tc peak (measured relative to the size of Tm), and low Tc and Tg temperatures indicate efficient crystallisation. Similarly, a high Tr indicates rapid crystallisation from the melt.

EXAMPLE 1

Table 1 gives thermoanalytical data on samples of extruded polyethylene terephthalate containing varying amounts of the polycaprolactone CAPA 601M (polycaprolactone with a NA molecular weight of 45,000–50,000 supplied by Interox Chemicals Ltd).

TABLE 1

| % Capa 601M | 0 | 5 | 10 | 20 |
|---|---|---|---|---|
| Tc (°C.) | 137 | 131/118* | 124/110* | 110/103* |
| Relative Crystallinity (%) | 30 | 37 | 26 | 29 |

*Double Peak

The relative crystallinity is an approximate guide to the amount of crystallinity present in the quenched sample before it is heated above the cold crystallisation temperature T$_c$.

$$\text{Relative Crystallinity (\%)} = 100 \frac{(A_m - A_c)}{A_m}$$

Where $A_m$ = Area of melting endotherm
$A_c$ = Area of cold crystallisation exotherm The results in Table 1 show that addition of the polycaprolactone alone produced a marked fall in T$_c$ of the polyethylene terephthalate, without any separate nucleant, such as sodium stearate, being present.

EXAMPLES 2 TO 5

To further explore the effect of polycaprolactone with other additives on the T$_c$ of the polyethylene terephthalate as used in Example 1 a series of compositions was made as described above to the following basic formulation:

| Polyethylene terephthalate (PET) | 70 parts |
|---|---|
| 3 mm glass fibre | 30 parts |
| Polycaprolactone | as specified |
| Sodium stearate | |

The PET was a dull fibre-grade polymer with a limiting viscosity number of 0.54, i.e., molecular weight approximately 16,600, containing titanium dioxide as a delustrant.

Results

Table II shows the temperature of the cold crystallisation peak (Tc) for a series of materials containing varying amounts of a polycaprolactone (CAPA 601M ex Interox Chemicals Ltd) 0.5% by weight of sodium stearate, and 3.0% by weight of a polycaprolactone (CAPA 200 ex Interox Chemicals Ltd) of N.A. molecular weight 550.

TABLE II

| Example No. | % Higher M W polycaprolactone by weight | Tc |
|---|---|---|
| 2 | 0 | 107 |
| 3 | 5 | 104 |
| 4 | 10 | 97 |
| 5 | 20 | 72 & 84 (double peak) |

It will be appreciated from this that the presence of sodium stearate and the two polycaprolactones in the material has further lowered the temperature Tc to a considerable extent relative to Example I.

EXAMPLES 6 TO 8

Table III shows the compositions and physical properties of small scale test mouldings made from PET of the same type as before but containing one or both of two grades of polycaprolactone namely CAPA 240 having a N.A. molecular weight of 4000 (ex Interox Chemicals Ltd) and CAPA 601M as in Example I above. In the compositions the amounts of all the ingredients except the glass fibres are given as parts by weight, a composition containing no caprolactone is included for comparison. The content of glass fibres is given as a percentage by weight of the total composition in each case.

TABLE III

| Example No. | 6 | 7 | 8 | 9 |
|---|---|---|---|---|
| PET | 100 | 90 | 90 | 100 |
| CAPA 601 M | 0 | 10 | 10 | 0 |
| CAPA 240 | 3 | 3 | 0 | 0 |
| Sodium Stearate | 0.5 | 0.5 | 0.5 | 0.5 |
| Percentage of Glass Fibres | 37 | 26 | 29 | 29 |
| Tensile Strength MPa | 132 | 127 | 119 | 122 |
| Tensile Modulus GPa | 12.4 | 10.9 | 9.0 | 9.7 |
| Elongation Percentage | 2.7 | 3.3 | 3.3 | 4.0 |
| Flexural Strength MPa | 199 | 205 | 194 | 195 |
| Flexural Modulus GPa | 10.4 | 10.3 | 8.6 | 8.4 |
| Charpy Notched Impact KJ/$m^2$ | 8.2 | 11.8 | 12.5 | 6.8 |
| Charpy Unnotched Impact KJ/$m^2$ | 22.0 | 32.0 | 31.0 | 22.6 |

Moulding Performance

All three materials of Examples 6, 7 and 8 respectively released from the mould at 100° C., although with a poor surface.

At 105° C. mould temperature Example 6 gave one side of a Water absorption (WA) disc completely dull with considerable dullness on the other side. Example 7 at 101° C. mould temperature gave much less dullness but there were additional flow marks.

At 116° C. mould temperature Example 7 produced a glossy surfaced moulding and Examples 6 and 8 had 10% surface dullness at 115° C. mould temperature. In contrast Example 9 gave mouldings with 50% surface dullness at 119° C. mould temperature.

The results of Example 8 are included to demonstrate that the additional plasticization of the lower molecular weight polycaprolactone gave a better finish: the appearance in Example 8, without the lower MW polycaprolactone is worse than that of Example 7. In conclusion, it may be seen that the inclusion of the higher molecular weight polycaprolactone in the compositions lowers the cold crystallisation temperature and gives improvement in impact strength over the use of the lower molecular weight material.

In all the following examples compositions are quoted in parts by weight except the glass fibre contents which, where quoted, are quoted as percentages by weight of total composition.

EXAMPLES 10 TO 12

Table IV shows the compositions and physical properties of small scale test mouldings made from PET of the same type as before but containing only higher molecular weight polycaprolactones. In example 11 and 12 the polycaprolactone used was the CAPA 601M as in Example 1 above but in Example 10 that used was CAPA 600M which is a polycaprolactone of N A molecular weight 25,000–30,000 also from Interox Chemicals Limited.

TABLE IV

| Example No | 10 | 11 | 12 |
|---|---|---|---|
| PET | 90 | 90 | 95 |
| CAPA 601M | 0 | 10 | 5 |
| CAPA 600M | 10 | 0 | 0 |
| Sodium Stearate | 0.5 | 0.5 | 0.5 |
| % Glass fibres | 27 | 32 | 34 |
| Tensile Strength MPa | 112 | 123 | 131 |
| Tensile Modulus GPa | 11.2 | 9.6 | 10.6 |
| Elongation % | 3.1 | 3.5 | 3.2 |
| Flexural Strength MPa | 177 | 189 | 198 |
| Flexural Modulus GPa | 8.5 | 9.2 | 9.7 |
| Charpy Impact Notched KJ/$m^2$ | 11.3 | 12.5 | 8.1 |
| Unnotched KJ/$m^2$ | 30 | 33 | 27 |
| Drop Weight Energy J | 0.63 | 0.59 | 0.59 |
| Mould Temperature | No data | 99° C. | 100° C. |
| Surface Finish on moulded disc | | about 50% of surface was dull | one side was dull the other 50% dull |

Example 10 gave test mouldings with 10% of surface dull at a mould temperature of 113° C. Examples 11 and 12 both gave test mouldings with about 20% of surface dull at a mould temperature of 114° C.

EXAMPLES 13 AND 14

These examples show the use of other plasticizers in place of lower molecular weight polycaprolactone in PET compositions containing higher molecular weight polycaprolactone and sodium stearate. Table V shows the compositions and physical properties of small scale test mouldings as before. The PET used was the same as before, and the polycaprolactone was the CAPA 601M as in Example I. The amounts of ingredients are given in parts by weight.

TABLE V

| Example No | 13 | 14 |
|---|---|---|
| PET | 90 | 90 |
| CAPA 601 M | 10 | 10 |
| Neopentyl glycol dibenzoate | 3 | 0 |
| dibenzyl adipate | 0 | 3 |
| Sodium Stearate | 0.5 | 0.5 |
| % Glass fibres | 30 | 26 |
| Tensile strength MPa | 112 | 103 |
| Tensile Modulus GPa | 9.6 | 8.2 |
| Elongation % | 3.0 | 3.3 |
| Flexural Strength MPa | 183 | 163 |
| Flexural Modulus GPa | 9.5 | 7.5 |
| Charpy Impact - notched KJ/$m^2$ | 8.9 | 9.4 |
| unnotched KJ/$m^2$ | >25.1 | 22.4 |
| Drop Weight Energy J | 0.31 | 0.55 |
| Mould Temperature | 100° C. | 99° C. |
| Surface finish on moulded disc | one side dull other side 50% dull | about 10% of area dull |

Both these examples gave test mouldings whose surface was glossy at 115° C. mould temperature.

EXAMPLES 15 TO 18

These examples illustrate the use of a polycaprolactone of lower number average (N A) molecular weight as primary additive, with dibenzyl adipate (DBA) as plasticizer and sodium stearate as nucleant.

Small scale test mouldings were made as before and details of the compositions and physical properties of the mouldings made from them are given below in Table VI. The PET used was fibre grade polymer of 16,600 molecular weight, and the polycaprolactone was the CAPA 600M of N A molecular weight 25,300–30,000.

TABLE VI

| Example No | 15 | 16 | 17 | 18 |
|---|---|---|---|---|
| PET | 90 | 90 | 90 | 90 |
| CAPA 600M | 10 | 10 | 10 | 10 |
| DBA | 0 | 1 | 3 | 3 |
| Sodium Stearate | 0.5 | 0.5 | 0.5 | 1.0 |
| % Glass fibres | 27 | 22 | 22 | 26 |
| Mould Temperature deg C. | 115 | 105 | 105 | 100 |
| Tensile Strength MPa | 112 | 90 | 83 | 77 |
| Tensile Modulus GPa | 8.8 | 7.3 | 7.0 | 7.7 |
| Elongation (% at break) | 3.1 | 2.7 | 2.9 | 2.5 |
| Flexural Strength MPa | 177 | 159 | 144 | 129 |
| Flexural Modulus GPa | 8.5 | 7.3 | 6.9 | 7.4 |
| Charpy Notched Impact $KJ/m^2$ | 11.3 | 6.7 | 6.1 | 6.4 |
| Charpy Unnotched Impact $KJ/m^2$ | 30 | 21 | 18 | 14 |

There was variation in glass content in these small scale experiments which was the cause of much of the drop in mechanical properties between Examples 15 and 16. The mould temperature quoted is that required to achieve a glossy-surfaced moulding.

EXAMPLES 19 TO 21

These examples investigate the effect upon mould temperature achieved by varying content of a plasticizer (dibenzyl adipate). The PET used was the fibre grade (M.W.16,600), the polycaprolactone was CAPA 601M (N.A. Mol. Wt 45,000–50,000) and small scale test mouldings were made as before. Table VII below gives details of the compositions and the physical properties of the mouldings made from them.

TABLE VII

| Example No | 19 | 20 | 21 |
|---|---|---|---|
| PET | 90 | 90 | 90 |
| CAPA 601M | 10 | 10 | 10 |
| DBA | 0 | 3 | 6 |
| Sodium Stearate | 0.5 | 0.5 | 0.5 |
| % Glass fibres | 29 | 26 | 23 |
| Mould Temperature °C. | 115 | 110 | 105 |
| Tensile Strength MPa | 119 | 102 | 89 |
| Tensile Modulus GPa | 9.0 | 8.8 | 6.9 |
| Elongation % | 3.3 | 2.8 | 3.1 |
| Flexural Strength MPa | 194 | 169 | 151 |
| Flexural Modulus GPa | 8.6 | 8.6 | 6.8 |
| Charpy Notched Impact $KJ/m^2$ | 12.5 | 8.0 | 7.7 |
| Charpy Unnotched Impact $KJ/m^2$ | >25 | 20 | 16 |

It should be noted that in this series of Examples the variation in glass content is not sufficient to have appreciable effect on mould temperature, although it would affect the physical properties of the mouldings. Use of the plasticizer improves the mould temperature but reduces the physical properties of the mouldings.

EXAMPLES 22 AND 23

These two Examples offer a direct comparison between two different grades of PET using the same amounts of polycaprolactone, (CAPA 601M of N.A. Mol. Wt 45,000–50,000) dibenzyl adipate, sodium stearate and glass. To ensure identical proportions of glass these compositions were pre-mixed and all fed into a small scale compounding extruder at one port. This, however, has a detrimental effect on physical properties of the mouldings so that the figures are not comparable with other examples.

Details of the compositions and physical properties of mouldings therefrom are included in Table VIII below.

TABLE VIII

| Example No | 22 | 23 |
|---|---|---|
| PET Type | Fibre | Bottle |
| Molecular Weight | 17,000 | 27,000 |
| PET | 90 | 90 |
| CAPA 601M | 10 | 10 |
| DBA | 3 | 3 |
| Sodium Stearate | 0.5 | 0.5 |
| % Glass fibres | 30 | 30 |
| Mould Temperature °C. | 110–115 | 110–115 |
| Tensile Strength MPa | 95 | 106 |
| Elongation % | 5.1 | 5.7 |
| Flexural Strength MPa | 162 | 188 |
| Flexural Modulus GPa | 8.3 | 8.6 |
| Charpy Notched Impact $KJ/m^2$ | 6.4 | 8.3 |
| Charpy Unnotched Impact $KJ/m^2$ | 22 | 36 |

It will be noted that the minimum mould temperature for glossy surfaced mouldings is the same for both compositions but the physical properties of the mouldings are better when using the higher molecular weight PET.

EXAMPLES 24 TO 26

In these Examples the PET is used in compositions without fibrous reinforcement and the effect of the high molecular weight polycaprolactone is illustrated.

The compositions were made up and tested on a small scale as before, details of composition and properties of mouldings being given in Table IX below.

TABLE IX

| Example No | 24 | 25 | 26 |
|---|---|---|---|
| PET | 100 | 90 | 80 |
| CAPA 601M | 0 | 10 | 20 |
| Sodium Stearate | 0.5 | 0.5 | 0.5 |
| Tensile Strength MPa B | 32* | 52 | 55 |
| Flexural Strength MPa | 97$^B$ | 81$^B$ | 71$^{CD}$ |
| Flexural Modulus GPa | 3.1 | 2.6 | 2.3 |
| Charpy Notched Impact $KJ/m^2$ | 3.3 | 5.1 | 8.1 |
| Charpy Unnotched Impact $KJ/m^2$ | 11 | 16 | 70 |
| Mould Temperature °C. | 120 | 103 | 105 |
| Appearance | dull | glossy | mottled |
| Release | sticking | good | poor |

$^B$ at break
$^{CD}$ conventional deflection
* badly voided specimen

At the addition level of 10 parts by weight per 100 of total polymer the polycaprolactone has dramatically improved the mouldability of the nucleated PET of Example 24. At the higher addition level the mouldability is still improved over Example 24 and impact strength is still further improved over Example 25 but the surface of the mouldings is mottled and the mould release is poor at this mould temperature.

EXAMPLES 27 TO 29

In these Examples compositions were made up using PET of fibre grade (Mol. Wt 16,600), glass fibre, sodium stearate and two different polycaprolactones, one example containing no polycaprolactone to act as control.

In previous examples the glass fibres have all been 3 mm chopped strand but in this case the glass was a continuous roving which was fed into a second (downstream) port on a twin screw Werner and Pfleiderer compounding extruder and broken up as the composition was being compounded.

The details of the compositions and properties of test mouldings are given below in Table X.

TABLE X

| Example No | 27 | 28 | 29 |
|---|---|---|---|
| PET | 90 | 100 | 90 |
| CAPA type | 600M | — | 601M |
| Pts weight of CAPA | 10 | 0 | 10 |
| Sodium Stearate | 0.5 | 0.5 | 0.5 |
| % Glass fibres | 27 | 26 | 26 |
| Tensile Strength MPa | 114 | 87 | 117 |
| Tensile Modulus GPa | 9.7 | 8.4 | 10.4 |
| Charpy Notched Impact KJ/m$^2$ | 7.5 | 5.2 | 7.6 |
| Charpy Unnotched Impact KJ/m$^2$ | 20 | 13 | 19 |

The mechanical properties are taken from materials all moulded at 110°. The compositions containing the polycaprolactones show greatly improved mechanical properties.

The relative moulding performance of the three compositions was investigated using varying mould temperatures on the injection moulding machine. Gloss of the mouldings was also measured using an Eel Varispec Gloss Head with a 45° angle of incidence and reflectance. The monitoring Galvanometer was set at 100% for the gloss base plate and 2" disc mouldings examined on both sides. Five discs were measured for each composition and the average taken to give the percentage figures shown in Table XI below.

TABLE XI

| Example No | Mould Temperature (°C.) | | | |
|---|---|---|---|---|
| | 100-105 | 110-115 | 120-125 | 130-135 |
| 27 | dull sticking 21% | glossy easy release 31% | | |
| 28 | dull & rough not sticking 7% | dull & rough sticking 13% | dull sticking 26% | glossy sticking 35% |
| 29 | dull sticking 16% | glossy easy release 29% | | |

EXAMPLES 31 TO 35

These Examples illustrate the use of an alternative nucleant, the nucleant chosen being a finally divided solid—microtalc of mean particle diameter 0.75 microns, 99% being less than 10 microns in diameter. The compositions were made up and test mouldings produced on a small scale using 3 mm chopped glass strand as before. Examples were made up using two different grades of PET, fibre grade of Mol. Wt 16,600 and bottle grade of Mol. Wt 24,000 with and without a polycaprolactone CAPA 601P (ex Interox Chemicals Ltd) of N.A. molecular weight 45,000–50,000.

Details of the compositions and of test mouldings made therefrom are given below in Table XII.

TABLE XII

| Example No | 31 | 32 | 33 | 34 | 35 |
|---|---|---|---|---|---|
| PET grade | Fibre | Bottle | Fibre | Bottle | Bottle |
| PET | 100 | 100 | 90 | 90 | 95 |
| CAPA 601P | — | — | 10 | 10 | 5 |
| Talc | 5 | 5 | 5 | 5 | 5 |

TABLE XII-continued

| Example No | 31 | 32 | 33 | 34 | 35 |
|---|---|---|---|---|---|
| % Glass fibres | 30 | 30 | 30 | 30 | 30 |
| Tensile Strength MPa | 107 | 115 | 97 | 107 | 113 |
| Tensile Modulus GPa | 10.5 | 10.2 | 10.4 | 10.2 | 10.5 |
| Elongation (%) | 1.9 | 2.1 | 1.7 | 2.2 | 2.9 |
| Flexural Strength MPa | 180 | 197 | 166 | 181 | 173 |
| Flexural Modulus GPa | 10.0 | 9.8 | 8.7 | 9.1 | 9.7 |
| Charpy Notched Impact Strength KJ/m$^2$ | 6.4 | 7.6 | 9.5 | 12.7 | 11.7 |
| Charpy Unnotched Impact Strength KJ/m$^2$ | 25 | 38 | 35 | 41 | 41 |
| Temperature for Gloss Release | >130° C. very poor | >130° C. very poor | 120° C. excellent | 120° C. excellent | 130° C. excellent |

All materials were made by 'combined feeding' as used in Examples 22 and 23.

EXAMPLES 36 TO 41

These Examples illustrate the effect on moulding performance and impact strength of varying the amount of high molecular weight polycaprolactone (CAPA 601M) in PET compositions. The PET was the fibre grade and the combined feeding method was used to ensure consistent glass fibre contact (as in Examples 22 and 23).

Details of the compositions and impact strengths and moulding performance are given below in Table XIII.

TABLE XIII

| Example No | 36 | 37 | 38 | 39 | 40 |
|---|---|---|---|---|---|
| PET | 100 | 95 | 90 | 80 | 70 |
| Capa 601M | — | 5 | 10 | 20 | 30 |
| Sodium Stearate | 0.5 | 0.5 | 0.5 | 0.5 | 0.5 |
| % Glass fibres | 20 | 20 | 20 | 20 | 20 |
| Charpy Notched Impact Strength KJ/m$^2$ | 4.3 | 4.3 | 6.9 | 8.1 | 5.2 |
| Charpy Unnotched Impact Strength KJ/m$^2$ | 12 | 14 | 25 | 23 | 14 |
| Temperature for Gloss °C. | 130 | 124 | 119 | ca 108 | — |
| Release | very poor | excellent | excellent | acceptable | very poor |

It will be noted that the moulding performance is greatly improved by the 5 and 10 parts additions of polycaprolactone but then the mould release characteristics begin to deteriorate again.

Gloss measurements were carried out on Examples 36 to 38 using the Eel Varispec Gloss Head as before.

The results of these measurements are given below in Table XIV.

TABLE XIV

| Example No | Mould Temperature | Gloss |
|---|---|---|
| 36 | 120° C. | 30% |
| 37 | 120° C. | 39% |
| 38 | C. | 31% |

EXAMPLES 41 TO 43

These examples illustrate the improvement in moulding characteristics obtainable with low molecular weight plasticizers, although with some deterioration in physical properties. The combined feeding was used for the glass fibres as in Examples 22 and 23. Details of the compositions and the properties of the test mouldings made therefrom are given in Table XV below.

TABLE XV

| Example No | 41 | 42 | 43 |
| --- | --- | --- | --- |
| PET | 90 | 90 | 90 |
| Capa 601M | 10 | 10 | 10 |
| Dibenzyl Azelate | — | 3 | — |
| PEG - 6000 | — | — | 3 |
| Sodium Stearate | 0.5 | 0.5 | 0.5 |
| % Glass fibres | 20 | 20 | 20 |
| Tensile Strength MPa | 91 | 63 | 66 |
| Tensile Modulus GPa | 6.3 | 6.4 | 6.6 |
| Elongation % | 2.2 | 1.3 | 1.2 |
| Flexural Strength MPa | 134 | 102 | 108 |
| Flexural Modulus GPa | 6.5 | 6.5 | 6.3 |
| Charpy Notched Impact Strength (KJ/m$^2$) | 6.9 | 4.5 | 4.9 |
| Charpy Unnotched Impact Strength (KJ/m$^2$) | 25 | 10 | 11 |
| Temperature for Gloss (°C.) | 119 | 111 | 111 |
| Release | (excellent) | (excellent) | (excellent) |

PEG 6000 - Polyethylene Glycol, molecular weight 6000

EXAMPLES 44 TO 46

These Examples illustrate the effect of increasing the amount of reinforcing fibre in the composition. The PET used was bottle grade of molecular weight 24,000, and glass was added by feeding rovings into a second port on a compounding extruder as in Examples 27 to 29.

Details of the compositions are given in Table XVI below, together with the physical properties of test mouldings made therefrom.

In examples 44 and 45 an assessment of heat distortion temperature was also made using BS 2782 Part 1 Method 121A as the test method. The results of this are also indicated in the Table XVI, the mouldings for this test being moulded at 85° C.

TABLE XVI

| Example No | 44 | 45 | 46 |
| --- | --- | --- | --- |
| PET | 90 | 90 | 90 |
| CAPA 601M | 10 | 10 | 10 |
| Sodium Stearate | 0.5 | 0.5 | 0.5 |
| Glass Fibres (%) | 15 | 30 | 45 |
| Tensile strength MPa | 88 | 128 | 182 |
| Tensile modulus GPa | 5.8 | 9.7 | 16.2 |
| Elongation at break (%) | 2.0 | 2.2 | 2.0 |
| Flexural strength MPa | 135 | 196 | 239 |
| Flexural modulus GPa | 5.7 | 9.2 | 12.9 |
| Charpy Notched Impact Strength KJ/m$^2$ | 7.5 | 9.9 | 12.3 |
| Charpy Unnotched Impact Strength KJ/m$^2$ | 18 | 29 | 37 |
| Mould Temperature (°C.) | All three materials had a glossy surface moulded at 120° C. and easy release | | |
| Release | | | |
| Heat distortion Temp (°C.) | >182 | >182 | |

EXAMPLES 47 AND 48

These Examples illustrate the use of polycaprolactone of a lower molecular weight. The PET used was fibre grade of molecular weight 16,600 and the nucleant was sodium stearate.

Two different polycaprolactones were used, one being CAPA 600M, N A molecular weight 25,000–30,000 as used above, the other being a polycaprolactone of wt average molecular weight 15,000 available from Union Carbide as "PCL-0300".

Details of compositions made up from these materials are given below in Table XVII, together with some physical properties of moulded samples. Both compositions gave a glossy surfaced moulding at a mould temperature of 115° C.

TABLE XVII

| Example No | 47 | 48 |
| --- | --- | --- |
| PET | 90 | 90 |
| PCL-0300 | 10 | — |
| CAPA 600M | — | 10 |
| Na Stearate | 0.5 | 0.5 |
| % Glass Fibres (3 mm) | 20 | 20 |
| Tensile strength MPa | 90 | 91 |
| Tensile modulus GPa | 6.8 | 6.7 |
| Elongation % | 2.6 | 2.5 |

We claim:

1. A polyester moulding composition consisting essentially of polyethylene terephthalate or a polyester containing at least 80% by weight of polyethylene terephthalate repeating units, polycaprolactone and a nucleant for crystallization of the polyethylene terephthalate, the polycaprolactone having a number average molecular weight of above 20,500.

2. A composition according to claim 1 in which there is included a reinforcing fibre in an amount of 5% to 55% by weight of the composition.

3. A composition according to claim 1 in which the amount of said polycaprolactone of molecular weight above 20,500 is in the range 2.5 to 25% by weight per 100 parts by weight of total polymer.

4. A composition according to claim 1 which includes up to 6 parts by weight per 100 parts by weight of total polymer of a plasticiser for the polyethylene terephthalate.

5. A composition according to claim 1 in which the nucleant is selected from the group consisting of metal salts of organic acids and finely divided materials which do not melt at or below the melting point of polyethylene terephthalate.

6. A composition according to claim 5 in which the nucleant comprises a metal salt of an organic acid and is present in an amount no greater than 1% by weight of the composition.

7. A composition according to claim 5 in which the nucleant comprises finely divided solid material in an amount up to 6 parts by weight per 100 parts by weight total polymer.

8. A polyester moulding composition consisting essentially of polyethylene terephthalate or a polyester containing at least 80% by weight of polyethylene terephthalate repeating units, polycaprolactone, a nucleant for crystallisation of the polyethylene terephthalate and optionally reinforcing fibres, the polycaprolactone having a number average molecular weight above 20,500, the amount of nucleant being not greater than 6 parts by weight per 100 parts by weight total polymer when reinforcing fibres are present in the composition, but not greater than 1.9 parts by weight per 100 parts by weight total polymer when no reinforcing fibres are present.

9. A composition according to claim 8 in which the nucleant comprises group 1 metal stearate and the amount of nucleant is in the range 0.1 to 0.7 percent by weight of the composition.

10. A composition according to claim 8 in which the nucleant comprises a finely divided solid material.

11. A composition according to claim 10 in which the finely divided solid material is a talc with a particle size less than 20 microns.

12. A composition according to claim 8 which comprises glass fibre in an amount in the range 5% to 55% by weight of the composition.

13. A composition according to claim 8 in which the polycaprolactone has a number average molecular weight not more than 100,000.

14. A composition according to claim 8 which includes up to 6 parts by weight per 100 parts by weight total polymer of a plasticiser for the polyethylene terephthalate said plasticiser being selected from the group consisting of polyethers, esters of aromatic alcohols or aromatic acids, and polycaprolactones having a number average molecular weight below 10,000.

15. A composition according to claim 14 in which the plasticiser is at least one of dibenzyl adipate, dibenzyl azelate, polyethylene glycol and neopentyl glycol dibenzoate.

16. A composition according to claim 1 in which the polycaprolactone has a number average molecular weight of at least about 25,000.

17. An article molded from the polyester molding composition of claim 1.

18. A composition according to claim 8 in which the polycaprolactone has a number average molecular weight of at least about 25,000.

19. An article molded from the polyester molding composition of claim 8.

* * * * *